Oct. 6, 1931.　　　　W. MERTÉ　　　　1,826,362
PHOTOGRAPHIC LENS
Filed Oct. 12, 1929
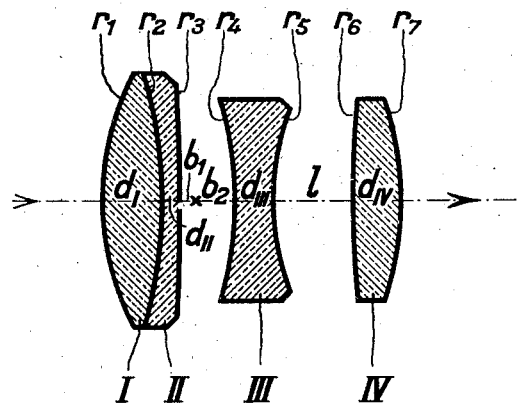
| | | |
|---|---|---|
| $r_1 = +41.6$ | | $d_I = 8.8$ |
| $r_2 = -66.1$ | | $d_{II} = 2.8$ |
| $r_3 = -378.0$ | | $b_1 = 2.5$ |
| $r_4 = -53.8$ | | $b_2 = 5.6$ |
| $r_5 = +38.0$ | | $d_{III} = 5.8$ |
| $r_6 = +152.5$ | | $l = 12.0$ |
| $r_7 = -47.1$ | | $d_{IV} = 6.9$ |
| | I | II |
|---|---|---|
| $n_d =$ | 1.62177 | 1.52547 |
| $\nu =$ | 56.8 | 52.8 |
| | III | IV |
|---|---|---|
| $n_d =$ | 1.62559 | 1.62177 |
| $\nu =$ | 35.7 | 56.8 |
Inventor:
Willy Merté

Patented Oct. 6, 1931

1,826,362

UNITED STATES PATENT OFFICE

WILLY MERTÉ, OF JENA, GERMANY, ASSIGNOR TO THE FIRM CARL ZEISS, OF JENA, GERMANY

PHOTOGRAPHIC LENS

Application filed October 12, 1929, Serial No. 399,344, and in Germany October 23, 1928.

This invention relates to photographic lenses, i. e. spherically, comatically, chromatically and astigmatically corrected lenses that consist of three parts, viz. of a diverging bi-concave part and of two converging parts that enclose the former, of which latter the one next to the incident light is composed of two members cemented together and the other one is a non-cemented single part. The new lenses are especially for short instantaneous photographs and, therefore, must have a great aperture ratio.

According to the invention this requirement is amply met by the said relatively simple lenses when the incident axial-parallel pencil of rays is comparatively strongly strangulated before striking the diverging lens so as to have a comparatively small diameter. In order to achieve this, the invention aims at providing the diverging lens at a comparatively great distance from the two bounding surfaces of the part that is next to the incident light. Then, with forms of lens that correspond to the invention, it is also possible to keep the errors of the oblique pencils within narrow limits. It is obvious that the lens, when applied for magnification of photographs, i. e. when it is used in a sense opposite to that obtaining in photography, offers the same advantages.

The drawing and the table below give as an example a longitudinal section through a photographic lens corresponding to the invention, whose aperture ratio is 1:2.7. With this lens the astigmatism is corrected for an image angle of 45°. The figures refer to a focal length of the photographic lens of 100 units.

| Radii | Thicknesses and distances |
|---|---|
| $r_1 = + 41.6$ | $d_I = 8.8$ |
| $r_2 = - 66.1$ | $d_{II} = 2.8$ |
| $r_3 = -378.0$ | $b_1 = 2.5$ |
| $r_4 = - 53.8$ | $b_2 = 5.6$ |
| $r_5 = - 38.0$ | $d_{III} = 5.8$ |
| $r_6 = +152.5$ | $l = 12.0$ |
| $r_7 = - 47.1$ | $d_{IV} = 6.9$ |

Kinds of glass

| | I | II | III | IV |
|---|---|---|---|---|
| $n_d =$ | 1.62177 | 1.52547 | 1.62559 | 1.62177 |
| $\nu =$ | 56.8 | 52.8 | 35.7 | 56.8 |

I claim:

1. A photographic lens consisting of a diverging bi-concave part and of two converging parts that enclose the former, of which latter the one next to the incident light is so composed of two members cemented together that the cemented surface is converging and the other of the two converging parts is a non-cemented single part, the vertex distance between the front surface of the part next to the incident light and the front surface of the diverging part being greater than one tenth of the total focal length of the photographic lens, and the clear distance between the back vertex of the part next to the incident light and the front vertex of the dispersive part being greater than one twentieth of the focal length of the photographic lens.

2. In a photographic lens according to claim 1, without taking into consideration the refractive index of the dispersive member in the part next to the incident light, the refractive indices referring to the $d$-line being all greater than 1.58.

3. In a photographic lens according to claim 1 the difference between the refractive indices on the cemented surface of the part next to the incident light being greater than seven hundredths.

4. In a photographic lens according to claim 1 the absolute value of the radius of curvature of the cemented surface of the part next to the incident light lying between the absolute values of the radii of curvature of the two adjacent surfaces.

WILLY MERTÉ.